United States Patent [19]

Nagano

[11] Patent Number: 4,838,401

[45] Date of Patent: Jun. 13, 1989

[54] UNIDIRECTIONAL ROTARY TRANSMISSION MECHANISM FOR BICYCLE PARTS

[75] Inventor: Masashi Nagano, Izumi, Japan

[73] Assignee: Shimano Industrial Company Limited, Osaka, Japan

[21] Appl. No.: 28,770

[22] Filed: Mar. 23, 1987

[30] Foreign Application Priority Data

Mar. 26, 1986 [JP] Japan .................................. 61-44499

[51] Int. Cl.[4] ............................................. F16D 41/12
[52] U.S. Cl. ....................................... 192/64; 192/46; 188/82.77
[58] Field of Search ................... 192/46, 64; 188/82.7, 188/82.77; 74/577 M

[56] References Cited

U.S. PATENT DOCUMENTS

| | | | |
|---|---|---|---|
| 1,362,591 | 12/1920 | von Beaulieu | 192/46 |
| 3,166,171 | 1/1965 | Schwerdhofer et al. | 192/64 |
| 4,328,882 | 5/1982 | Isobe | 192/64 |
| 4,453,729 | 6/1984 | Lucken | 192/46 |

FOREIGN PATENT DOCUMENTS

| | | | |
|---|---|---|---|
| 656119 | 1/1938 | Fed. Rep. of Germany . | |
| 824448 | 12/1951 | Fed. Rep. of Germany | 192/64 |
| 1505933 | 9/1969 | Fed. Rep. of Germany . | |
| 2152160 | 7/1985 | United Kingdom . | |

OTHER PUBLICATIONS

French Search Report.

*Primary Examiner*—Rodney H. Bonck
*Assistant Examiner*—David A. Testardi
*Attorney, Agent, or Firm*—Stevens, Davis, Miller & Mosher

[57] ABSTRACT

A transmission mechanism which includes a rotatable driving member and a driven member. One of the driving member and the driven member includes ratchet teeth and the other supports a first transmission pawl and a second transmission pawl each having engaging portions engageable with the ratchet teeth and substantially semicircular-shaped base portions. A substantially C-shaped pawl spring is wrapped around the one of the driving member and the driven member which supports the pawls. The pawl spring biases the first transmission pawl and the second transmission pawl in a direction such that the engaging portions thereof engage with the ratchet teeth. A locking member is provided to prevent rotation of the pawl spring. The first transmission pawl is positioned such that its engaging portion is oriented toward the first free end of the pawl spring and the second transmission pawl is positioned such that its engaging portion is oriented away from the second free end of the pawl spring. The pawls and the spring are positioned such that spring forces applied to the pawls to raise them into engagement with the ratchet teeth are equalized.

2 Claims, 2 Drawing Sheets

UNIDIRECTIONAL ROTARY TRANSMISSION MECHANISM FOR BICYCLE PARTS

FIELD OF THE INVENTION

The present invention relates to a unidirectional rotary transmission mechanism for a bicycle, and more particularly, to a unidirectional rotary transmission mechanism for a bicycle part, such as a freewheel, which is adapted to transmit a driving force to a driven member from a driving member when the driving member is rotating in only one direction and above the driving member to freely rotate relative to the driven member when rotating in the other direction.

BACKGROUND OF THE INVENTION

Conventional bicycle parts, such as a freewheel or a free type gear crank means, employ a unidirectional rotary transmission mechanism which comprises, as shown in the freewheel in FIG. 4, a cylindrical driving member DV having at its inner periphery ratchet teeth A. The mechanism also includes a driven member DN provided with first and second transmitting pawls B and C having engaging portions B1 and C1 engageable with the ratchet teeth A and semicircular bases B2 and C2 and supported to the driven member DN to be capable of rising or falling through the bases B2 and C2 respectively. The mechanism also includes a C-shaped pawl spring S having a pair of first and second free ends S1 and S2 and biasing the transmitting pawls B and C toward the ratchet teeth A respectively. The driven member DN has a projection E for locking the pawl spring S, so that the driving member DV, when rotating in the normal direction, transmits its driving force to the driven member DN through the ratchet teeth A and transmitting pawls B and C, thereby rotating the driven member DN integrally with the driving member DV. On the other hand, when the driving member DV rotates in the reverse direction, the transmitting pawls B and C fall against the pawl spring S and the engaging portions B1 and C1 ride over the ratchet teeth A, whereby the transmitting pawls B and C disengage therefrom. As a result, the driving member DV freely rotates with respect to the driven member DN.

However, the first and second transmitting pawls B and C in the conventional unidirectional rotary transmission mechanism of FIG. 4 are disposed symmetrically with respect to a straight line X passing through the center of an interval between the first and second free ends S1 and S2 of the pawl spring S and the axis of the driven member DN. This yields a different in the distances between the engaging portions of the pawl spring S engageable with the transmitting pawls B and C and the free S1 and S2. As a result, a spring force of the spring S when the second transmitting pawl C falls against the pawl spring S is smaller than that when the first transmitting pawl B falls against the same.

When the first and second transmitting pawls B and C fall against the spring force of the pawl spring S, the spring S engages with the edges of the bases of B2 and C2 of the transmitting pawls B and C and these engaging portions are urged radially outwardly of the driven member DN so as to cause pawls B and C respectively to fall down toward driven member DN. The base B2 of the first transmitting pawl B is positioned farther away from first free end S1 of the spring S than engaging portion B1 of the first pawl B. Base C2 of the second transmitting pawl C is positioned closer to second free end S2 of the spring S than engaging portion C1 of the second pawl C. In other words, a length between the first free end S1 and the engaging portion of the pawl spring S engageable with the first transmitting pawl B is larger than that between the second free-end S2 and the engaging portion of the pawl spring S engageable with the second transmitting pawl C, whereby the spring force acting on the second transmitting pawl C becomes smaller than that on the first transmitting pawl B.

The spring constant of the pawl spring S has hitherto been set to apply to the second transmitting pawl C a spring force sufficient to raise it, so that the first transmitting pawl B, which is originally subjected to a large spring force, will be subjected to an even larger spring force. Accordingly, and increase in the spring force applied to the first transmitting pawl B enlarges a rotational resistance of the driving member when freely rotating, thereby creating a problem in that not only does the rotation efficiency of the driving force deteriorate but also the transmitting pawls, which ride over each ratchet tooth, strike the bottom thereof to generate large noises.

SUMMARY OF THE INVENTION

An object of the invention is to provide a unidirectional rotary transmission mechanism for bicycle parts, which is capable of equalizing to a minimum value the spring force to be applied to first and second transmitting pawls so that a rotational resistance of the driving member when freely rotating is reduced, and sounds generated by the transmitting pawls striking the bottom of each ratchet tooth are reduced.

In the present invention, a unidirectional rotary transmission mechanism for a bicycle part having a driving member and a driven member is provided with ratchet teeth provided at one of the driving member and the driven member. First and second transmitting pawls are provided each having as engaging portion engageable with the ratchet teeth and a semicircular base and supported to the other of the driving member and driven member to be capable of freely rising or falling . AC-shaped pawl spring having first and second free ends is provided for biasing each transmitting pawl in the direction of engaging with the ratchet teeth a locking means blocks rotation of the pawl spring. The first transmitting pawl has its engaging portion engageable with the ratchet teeth oriented toward the first free end of the pawl spring and the second transmitting pawl has its engaging portion engageable with the ratchet teeth oriented away from the second free end. A distance between the center of the base at the first transmitting pawl and the first free end of the pawl spring is smaller than that between the center of the base at the second transmitting pawl and the second free end of the pawl spring .

In other words, the first and second transmitting pawls are disposed asymmetrically with respect to a line passing through the center of a space between the first free end and the second free end of the pawl spring and the common axis of rotation of the driving and driven members so that the spring forces acting on the first and second transmitting pawls are minimized to raise them and to make them equal to each other.

The pawl spring engages with the edge of the base of each transmitting pawl, so that it is preferable that a distance between the engaging portion of the pawl spring engageable with the first transmitting pawl and the first free end of the pawl spring is equal to that between the engaging portion of the same engageable with the second transmitting pawl and the second free end of the pawl spring. For this purpose, in the construction of the invention, a central angle between a radius connecting the center of the base of the first transmitting pawl with the common axis of rotation of the driving and driven members and a line connecting the circumferential center of the projection constituting the locking means with the common axis of rotation of the same is different from that between a radius connecting the center of the base of the second transmitting pawl with the aforesaid common axis of rotation and the line connecting the circumferential center of the projection with the common axis of rotation. In addition a central angle between a radius passing through the edge of the base of the first transmitting pawl engageable with the pawl spring and the aforesaid line connecting the center of the projection constituting the locking means with the common axis of rotation is made equal to that between a radius passing through the edge of the base of the second transmitting pawl engageable with the pawl spring and the aforesaid line connecting the center of projection constituting the locking means with the common axis of rotation.

Accordingly, when the first and second transmitting pawls fall against the pawl spring, the pawl spring engages with the base of each transmitting pawl, and the base thereof is urged against a spring force of the pawl spring radially outwardly of the driven member so that each transmitting pawl is subjected to an equivalent spring force of the pawl spring. As a result, the spring force acting on the first transmitting pawl is reduced and that acting on the second one is increased, with the spring force necessary to raise each pawl and engage it with the ratchet teeth being minimized and equalized to each other. Hence, a rotational resistance of the driving member when freely rotating can be reduced and noises generated by the pawls striking the bottom of each ratchet tooth can be decreased.

The above and other objects and novel features of the invention will be more fully apparent from the following detailed description when the same is read in connection with the accompanying drawings.

BRIEF DESCRIPTION OF THE INVENTION

FIG. 1 is a sectional view of a unidirectional rotary transmission mechanism of the invention incorporated in a freewheel for a bicycle, FIG. 2 is a partially cutaway longitudinal sectional view of the FIG. 1 embodiment, and FIG. 3 is a sectional view illustrating a conventional unidirectional rotary transmission mechanism.

DETAILED DESCRIPTION OF THE PREFERRED EMBODIMENT

Figure 1:
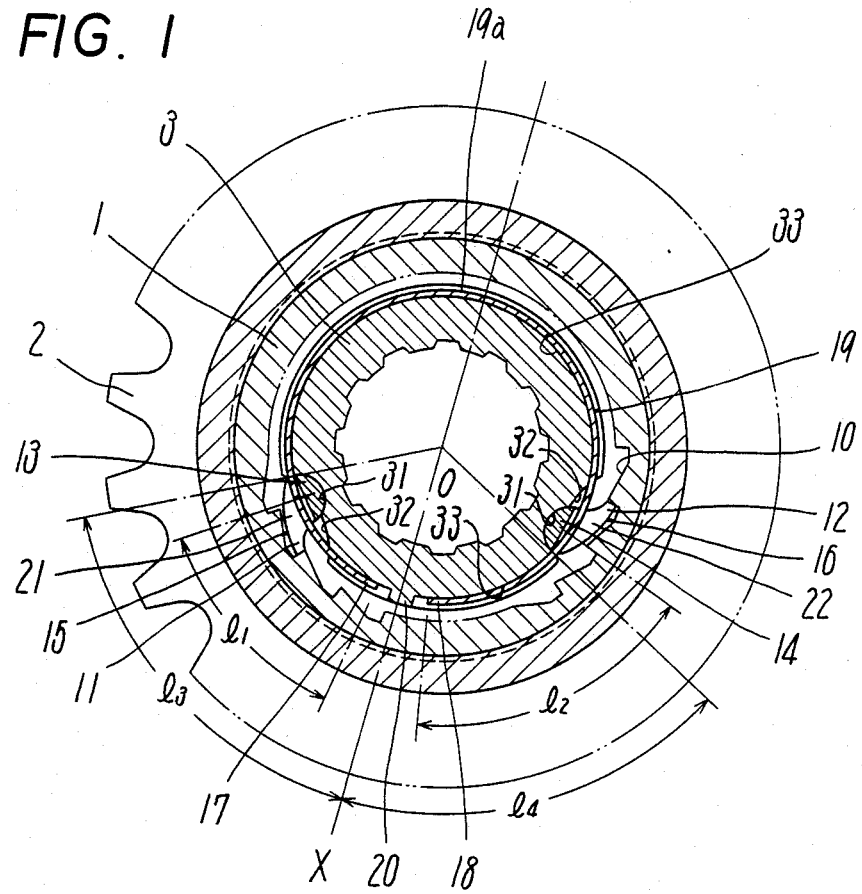
Figure 2:
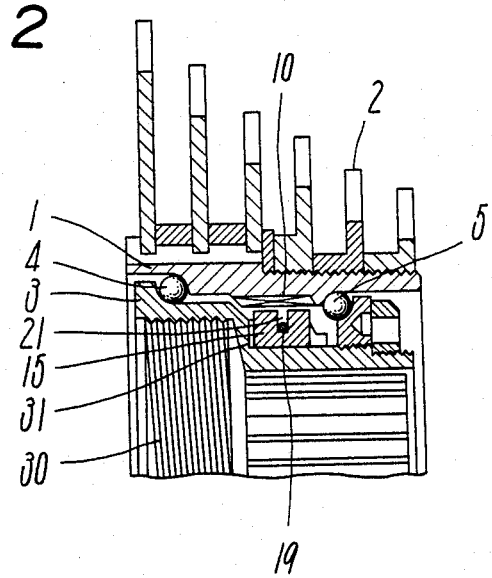

Referring to FIGS. 1 and 2, a unidirectional rotary transmission mechanism according to the invention is applied to a unit hub mounted on a hub shell at a rear wheel hub for a bicycle. The unit hub comprises a cylindrical driving member 1 having at the outer periphery thereof a plurality of sprocket wheels and a socket-like driven member 3 having at the inner periphery thereof a screw thread 30 screwable with the hub shell. The driving member 1 is supported rotatably to the driven member 3 through a pair of bearings 4 and 5. The unidirectional rotary transmission mechanism of the invention is formed between the driving member 1 and the driven member 3.

In FIGS. 1 and 2, ratchet teeth 10 are provided at the inner periphery of the driving member 1. First and second transmitting pawls 15 and 16 having engaging portions 11 and 12 engageable with the ratchet teeth 10 and having semicircular bases 13 and 14 are supported at the outer periphery of the driven member 3 through the bases 13 and 14 to be able to freely rise or fall toward and away from ratchet teeth 10. A C-shaped pawl spring 19 is provided around driven member 5, which has first and second free ends 17 and 18 and biases the transmitting pawls 15 and 16 in the direction of engaging with the ratchet teeth 10. At the driven member 3 is provided a projection 20 constituting a locking means for retaining the first and second free ends 17 and 18 of pawl spring 19 to block the rotation thereof.

At the outer periphery of the driven member 3 are provided recessed holders 31 rotatably holding the bases 13 and 14 of the transmitting pawls 15 and 16 respectively, escape recesses 32 for receiving therein the engaging portions 11 and 12 of the pawls 15 and 16 and in continuation of the recessed holders 31 respectively, and an annular groove 33 for receiving therein the pawl spring 19.

The transmitting pawls 15 and 16 have slits 21 and 22 respectively receiving therein the pawl spring 19. The first transmitting pawl 15 has its base 13 disposed away from first free end 17 of the pawl spring 19 with engaging portion 11 being closer to free end 17. Second transmitting pawl 16 has its base 14 disposed closer to second free end 18 with engaging portion 12 farther away from free end 18.

The pawl spring 19 is inserted into the annular groove 33 in slits 21 and 22 at the transmitting pawls 15 and 16 and engages with the edges of the bases 13 and 14 thereby biasing the transmitting pawls 15 and 11 in the direction of rising to maintain the engaging condition thereof with the ratchet teeth 10 respectively.

In the FIG. 1 device, the first and second transmitting pawls 15 and 16 are disposed asymetrically with respect to a line passing through the circumferential center O of a space between the first and second free ends 17 and 18 of the spring 16 and the common axis of rotation of the driving member 1 and driven member 3 in such a manner that a length $l_1$ between the first free end 17 of pawl spring 19 and the center of the base 13 of the first transmitting pawl 15 which has its engaging portion 11 oriented toward the first free end 17 is smaller than a distance $l_2$ between the second free end 18 of the pawl spring 19 and the center of the base 14 of the second transmitting pawl 16 having its engaging portion 12 oriented away from second free end 18.

In the FIG. 1 mechanism the driving member 1, when rotating normally, transmits its driving force to the driven member 3 through the transmitting pawls 15 and 16 respectively, thereby rotating the driven member 3 integrally with the driving member 1.

When the driving member 1 rotates reversely, the transmitting pawls 15 and 16 fall against the pawl spring 19 and disengage from the ratchet teeth 10, whereby the driving member 1 freely rotates with respect to the driven member 3.

When the first transmitting pawl 15 falls, the pawl spring 19 deflects to shift at the first free end 17 radially outwardly of the driven member 3 using an intermediate portion of the spring 19 between the pawls 15 and 16 as the flexing portion. When the second tramsmitting pawl 16 falls, the pawl spring 19 deflects to shift at the second free end 18 radially outwardly of the driven member 3 using the intermediate portion 19a as the flexing portion.

Figure 3:
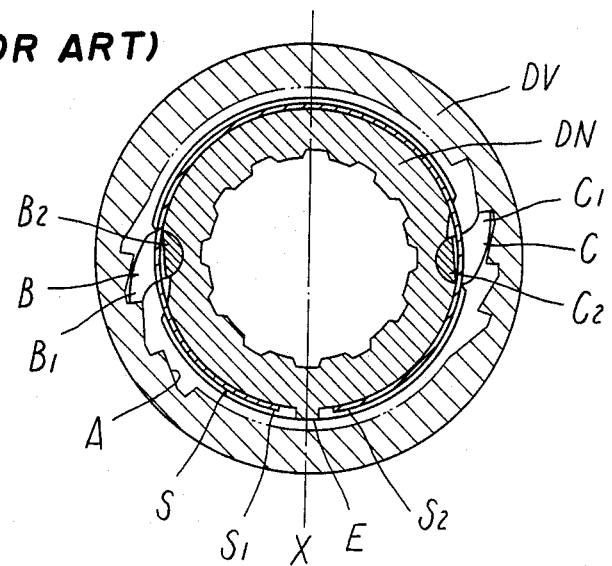

Since the length $l_1$ between the center of the base 13 of the first transmitting pawl 15 and the first free end 17 of the pawl spring 19 is made smaller than length $l_2$ between the center of the base 14 at the second transmitting pawl 16 and the second free end 18 of the pawl spring 19, and the first and second transmitting pawls 15 and 16 are disposed asymmetrically with respect to a line X passing through the center of an interval between the first and second free ends 17 and 18 and the common axis of rotation of the driving and driven members 1 and 3, the spring force acting on the first transmitting pawl 15 is smaller than that in the conventional mechanism shown in FIG. 3, and the spring force acting on the second transmitting pawl 16 is greater than in the conventional mechanism. Hence, the spring forces acting on the transmitting pawls 15 and 16 can be equalized to a minimum necessary to raise them, thereby enabling the rotational resistance against free rotation of the driving member 1 and hitting sounds caused by the pawls to be reduced.

According to the invention, the transmitting pawls 15 and 16 are preferably positioned, as shown in FIG. 1 in a such that lengths $l_3$ and $l_4$ between the engaging portions of the pawl spring 19 engageable with the edges of the bases 13 and 14 at the transmitting pawls 15 and 16 and the line X passing through the center of interval between the free ends 17 and 18 of the pawl spring 19 respectively, are equal to each other, Referring to FIG. 1, first and second transmitting pawls 15 and 16 are closer to free ends 17 and 18 of a pawl spring 19 than in the conventional example in FIG. 4, in which the pawls B and C are disposed at 90° l with respect to the line X.

In detail, the first transmitting pawl 15 is disposed to make a central angle of 55° between the center of the base 13 and the line X, the second transmitting pawl 16 being disposed at a central angle of 71° between the center of the base 14 and the line X.

In this case, a central angle between a radius passing through the center of each base 13 or 14 and that passing through each engaging portion of the pawl spring 19 engageable therewith is 8°, and that between a radius passing through the engaging portion at the base of each pawl 15 or 16 engageable with the spring 19 and the line X is 63°, so that the aforesaid lengths $l_3$ and $l_4$ are equal to each other.

Alternatively, the projection 20 of the locking means may be separate from the driven member 3.

Also, the ratchet teeth 10 may be provided at the driven member 3 and the transmitting pawls 15 and 16 may be provided to the driving member 1. The driven member 3 may alternatively be provided outside the driving member 1.

Furthermore, the unidirectional rotary transmission mechanism of the invention can be incorporated in a freewheel, an internal speed changing device, a gear crank means of a front-free type and a speed control device for the bicycle, other than the unit hub thereof, thus being not limited to the position for use.

While a preferred embodiment of the invention has been described using specific terms, such description is for illustrative purpose only, and it is understood that changes and variations may be made without departing from the spirit or scope of the following claims.

What is claimed is:

1. A unidirectional rotary transmission mechanism for a bicycle, comprising:

a rotatable driving member;

a driven member rotatably driven responsive to rotation of said driving member;

one of said driving member and said driven member including ratchet teeth and the other of said driving member and said driven member supporting a first transmission pawl and a second transmission pawl each having (i) engaging portions engageable with said ratchet teeth and (ii) substantially semicircular-shaped base portions;

a substantially C-shaped pawl spring wrapped around said other of said driving member and said driven member which supports said transmission pawls, for (i) holding said first transmission pawl and said second transmission pawl to said other of said driving member and said driven member which supports said transmission pawls and (ii) biasing said first transmission pawl and said second transmission pawl in a direction such that said engaging portions engage with said ratchet teeth of said one of said driving member and said driven member; and a locking means for preventing rotation of said pawl spring relative to said other of said driving member and said driven member;

said pawl spring having a first free end and a second free end;

said first transmission pawl being positioned such that its said engaging portion is oriented toward said first free end and said second transmission pawl being positioned such that its said engaging portion is oriented away from said second free end; and said first transmission pawl and said second transmission pawl being located at position such that a distance between an engaging portion of said pawl spring with said base of said first transmission pawl and said first free end of said pawl spring and a distance between an engaging portion of said pawl spring with said base of said second transmission pawl and said second free end of said pawl spring are made equal to each other.

2. A unidirectional rotary transmission mechanism according to claim 1, wherein a smaller angle between a radius of said driving member passing through the center of said base at each of said transmitting pawls and a line connecting the circumferential center of said locking means with the common axis of rotation of said driving member and said driven member is smaller than 90 degrees.

* * * * *